(12) United States Patent
Matsumoto (10) Patent No.: US 9,369,601 B2
(45) Date of Patent: Jun. 14, 2016

(54) IMAGE READING APPARATUS HAVING A FLEXIBLE FLAT CABLE

(71) Applicant: CANON KABUSHIKI KAISHA, Tokyo (JP)

(72) Inventor: Akira Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/961,682

(22) Filed: Aug. 7, 2013

(65) Prior Publication Data

US 2014/0043663 A1    Feb. 13, 2014

(30) Foreign Application Priority Data

Aug. 9, 2012    (JP) ................................. 2012-177087

(51) Int. Cl.
*H04N 1/024*    (2006.01)
*H04N 1/10*    (2006.01)
*H04N 1/00*    (2006.01)

(52) U.S. Cl.
CPC ........... *H04N 1/0249* (2013.01); *H04N 1/0083* (2013.01); *H04N 1/1026* (2013.01); *H04N 1/1035* (2013.01)

(58) Field of Classification Search
CPC . H04N 1/0083; H04N 1/0249; H04N 1/1026; H04N 1/1035
USPC .................................. 358/497, 474, 1.13, 498
See application file for complete search history.

(56) References Cited

U.S. PATENT DOCUMENTS

| 5,923,350 A * | 7/1999 | Ohnishi et al. ................... 347/50 |
| 6,903,849 B2 * | 6/2005 | Yokota ........................... 358/474 |
| 2001/0040705 A1 | 11/2001 | Yokota |
| 2006/0158696 A1 * | 7/2006 | Amimoto ....................... 358/474 |
| 2008/0068679 A1 * | 3/2008 | Murai ............................ 358/497 |
| 2008/0316547 A1 * | 12/2008 | Kim .............................. 358/474 |
| 2009/0244655 A1 | 10/2009 | Mukai et al. |
| 2011/0235140 A1 * | 9/2011 | Ito et al. ......................... 358/498 |
| 2011/0242618 A1 * | 10/2011 | Takeuchi et al. .............. 358/474 |
| 2012/0250057 A1 * | 10/2012 | Miyanagi et al. ............. 358/1.13 |
| 2013/0250373 A1 * | 9/2013 | Takeuchi ....................... 358/474 |

FOREIGN PATENT DOCUMENTS

| CN | 101329529 A | 12/2008 |
| CN | 101552856 A | 10/2009 |
| JP | H04-112611 A | 4/1992 |
| JP | 2001-346006 A | 12/2001 |
| JP | 2010-093645 A | 4/2010 |
| JP | 2012-088471 A | 5/2012 |

* cited by examiner

*Primary Examiner* — Benny Q Tieu
*Assistant Examiner* — Quyen V Ngo
(74) *Attorney, Agent, or Firm* — Canon U.S.A., Inc. IP Division (57) ABSTRACT

An image reading apparatus includes a platen on which a document is placed, an image reading unit configured to be movable under the platen, to receive light reflected by the document placed on the platen, and to output an image signal, a flexible flat cable configured to transfer the image signal output from the image reading unit, and a holding member configured to hold the flexible flat cable and attached to the image reading unit. The image reading unit includes a connection portion to which the flexible flat cable is connected, and, when the image reading unit is moved, a curvature portion of the flexible flat cable is formed opposite the connection portion across the image reading unit in a direction in which the image reading unit is moved.

12 Claims, 10 Drawing Sheets

IMAGE READING APPARATUS HAVING A FLEXIBLE FLAT CABLE

BACKGROUND

1. Field

Aspects of the present invention generally relate to an image reading apparatus using a flexible flat cable.

2. Description of the Related Art

A conventionally known image reading apparatus is described below with reference to FIGS. 9 and 10.

Within a frame member 901 of an image reading apparatus, an image reading unit 902 reciprocally movable inside the frame member 901 is provided. The image reading unit 902 is provided with a sensor substrate into which an image sensor such as a charge coupled device (CCD) is incorporated, an illumination unit for illuminating a document image, and a lens for performing imaging of light reflected from a document onto the image sensor. The image reading unit 902 reads the document laid on a document positioning glass plate 903 while moving under the document positioning glass plate 903.

The image reading unit 902 is reciprocally moved by a driving force of a motor arranged in the frame member 901. In the specification, a direction in which the image reading unit 902 is reciprocally moved is called a sub-scanning direction and a direction orthogonal to the sub-scanning direction (the longitudinal direction of the image reading unit 902) is called a main-scanning direction.

Figure 9:
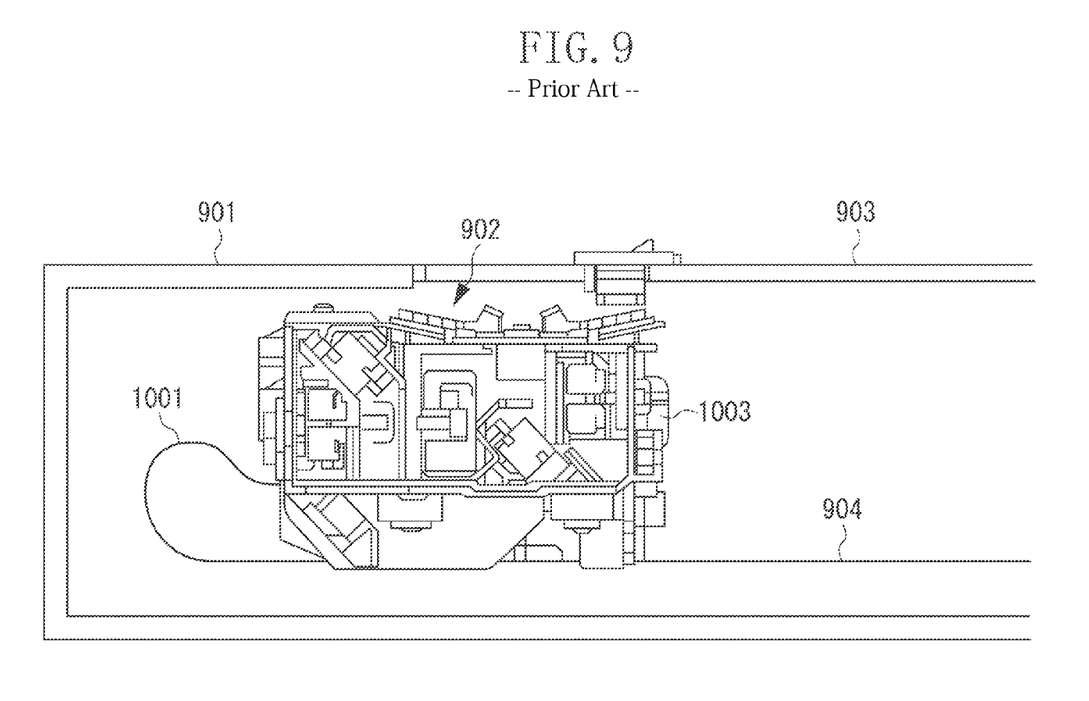
FIG. 9 is a cross section illustrating a conventional image reading apparatus.

In FIG. 9, a sensor substrate is provided on the right of the image reading unit 902. FIG. 10 illustrates a perspective view of the image reading unit 902 drawn from a view point where a sensor substrate 1003 and a flexible flat cable 904 (hereinafter referred to as an FFC) can be observed.

The image reading apparatus includes a controller substrate (not illustrated) for providing a motor with a control signal to move the image reading unit 902 and for processing the image signal output from the image reading unit 902.

The image reading unit 902 is connected to the controller substrate by the FFC 904 to perform communication using the control signal and the image signal between the controller substrate and the image reading unit 902. One end of the FFC 904 is connected to the sensor substrate 1003 of the image reading unit 902.

In FIG. 9, a curvature portion 1001 of the FFC 904 is provided at the left of the image reading unit 902 to prevent the FFC 904 from being buckled when the image reading unit 902 is reciprocally moved, allowing the image reading unit 902 to be smoothly moved.

In a conventional technique, guide portions 1002 for guiding the FFC 904 are provided on the bottom surface of the image reading unit 902. Part of the FFC 904 connected to the sensor substrate 1003 is held by the guide portions 1002 on the bottom surface of the image reading unit 902 and the FFC 904 is guided to the left of the image reading unit 902 in FIG. 9. In FIG. 9, the curvature portion 1001 of the FFC 904 is formed at the left of the image reading unit 902 in the sub-scanning direction.

The conventional image reading apparatus, however, has to-be-solved problems of workability in attaching and detaching the FFC to and from the image reading unit 902.

Since the workability in attaching and detaching the FFC to and from the conventional image reading apparatus is poor, wrinkles and scratches may be made during the operation in which the FFC is guided by the guide portions. The wrinkles and scratches may cause breaking of the wires of the FFC.

SUMMARY

According to an aspect of the present invention, an image reading apparatus includes a platen on which a document is placed, an image reading unit configured to be movable under the platen, to receive light reflected by the document placed on the platen, and to output an image signal, a flexible flat cable configured to transfer the image signal output from the image reading unit, and a holding member configured to hold the flexible flat cable. The image reading unit includes a connection portion to which the flexible flat cable is connected, and, when the image reading unit is moved, a curvature portion of the flexible flat cable is formed opposite the connection portion across the image reading unit in a direction in which the image reading unit is moved.

Further features of the present disclosure will become apparent from the following description of exemplary embodiments with reference to the attached drawings.

DESCRIPTION OF THE EMBODIMENTS

Various exemplary embodiments, features, and aspects will be described in detail below with reference to the drawings. An exemplary embodiment described below is not to be seen to limit the technical scope of the present disclosure.

A general configuration of an image reading apparatus 202 according to the present exemplary embodiment is described below with reference to FIGS. 2, 3, and 4. The image reading apparatus 202 is merely an example and additional embodiments can also be applied to a facsimile apparatus or a multifunction peripheral equipped with the image reading apparatus 202.

Figure 2:
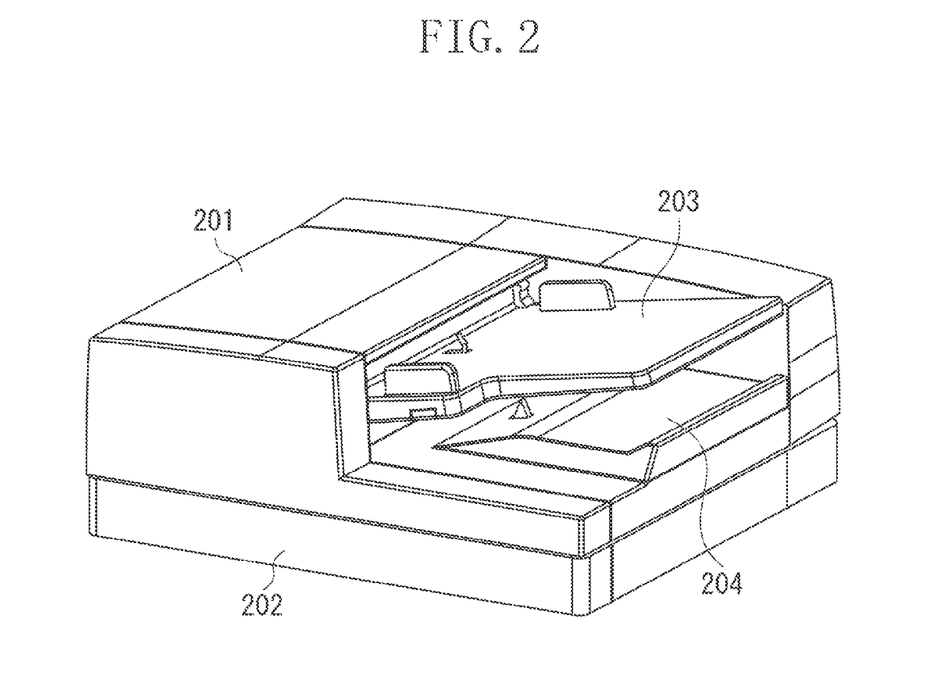
FIG. 2 is a schematic diagram illustrating a configuration of an image reading apparatus equipped with an automatic document feeding apparatus (ADF).

FIG. 2 is a schematic diagram illustrating the image reading apparatus 202 equipped with an automatic document feeding apparatus 201 (hereinafter referred to as an ADF). FIG. 3 is a schematic diagram illustrating the image reading apparatus 202 with the ADF 201 opened.

As illustrated in FIG. 2, the ADF 201 is attached to the upper portion of the image reading apparatus 202. The ADF 201 includes a paper feed tray 203 on which a plurality of documents can be laid. The documents laid on the paper feed tray 203 are separated one by one, conveyed to an image reading position, and discharged to a discharge tray 204. The document is read by an image reading unit 401 laying under the image reading position while being conveyed (hereinafter referred to as "reading during conveyance").

Figure 3:
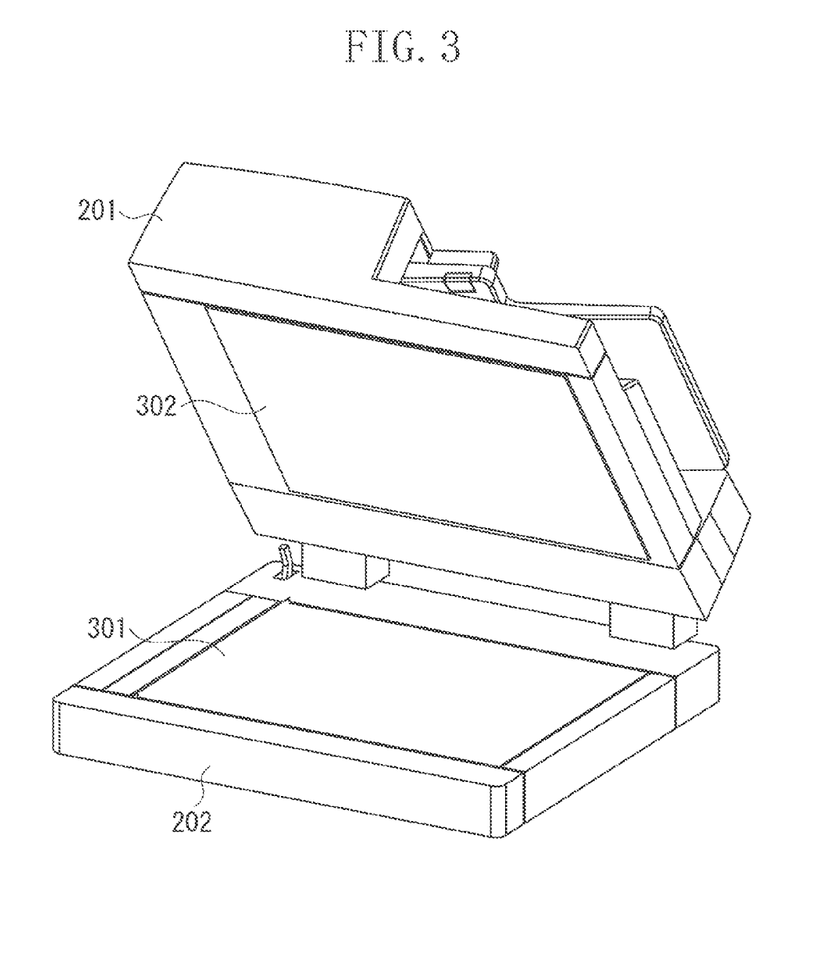
FIG. 3 is a schematic diagram illustrating the image reading apparatus with the ADF opened.

As illustrated in FIG. 3, the ADF 201 can be opened with respect to the image reading apparatus 202. A platen 301 is formed of a transparent member such as glass. The ADF 201 is opened with respect to the image reading apparatus 202 to allow a document or a thick document (a book, for example) to be laid on the platen 301. The ADF 201 is closed with respect to the image reading apparatus 202 to press the document laid on the platen 301 by a pressing plate 302 provided on the bottom surface of the ADF 201. The image reading unit 401 moves under the platen 301 in the sub-scanning direction to read the document laid on the platen 301 (hereinafter referred to as "fixed-reading").

Figure 4:
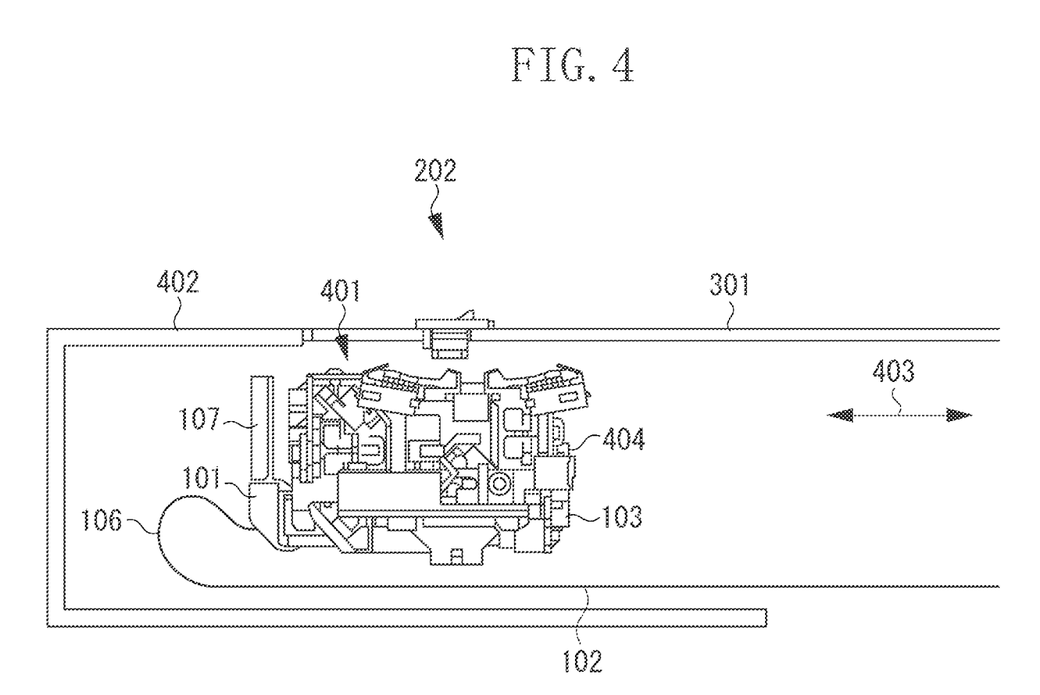
FIG. 4 is a cross section illustrating the image reading apparatus.

FIG. 4 is a cross section illustrating the image reading apparatus 202. The image reading unit 401 is arranged inside a frame member 402 and reciprocally movable in a sub-scanning direction 403. The image reading unit 401 includes an illumination unit such as a light emitting diode (LED) for illuminating a document in an image reading position, an image sensor such as a CCD, a sensor substrate 404 into which the image sensor is incorporated, and an optical lens for performing imaging of light reflected from the document onto the image sensor. In FIG. 4, the sensor substrate 404 is fixed to the right of the image reading unit 401 in the sub-scanning direction 403. The image sensor receives light reflected from the document illuminated by the illumination unit to generate an image signal. The image reading unit 401 outputs the generated image signal. The image reading unit 401 includes a controller substrate (not illustrated) for providing a control signal to a motor to move the image reading unit 401 and for processing the image information output from the image reading unit 401. The image reading unit 401 is connected to the controller substrate by a flexible flat cable (FFC) 102 to communicate therebetween using the control and image signals. One end of the FFC 102 is connected to a connection portion 103 of the sensor substrate 404 and the other end is connected to the controller substrate. The image information output from the sensor substrate 404 of the image reading unit 401 is transferred to the controller substrate via the FFC 102, and then the information is processed.

A positional relationship between the image reading unit 401 and the FFC 102 is described below. In FIG. 4, the sensor substrate 404 is fixed to the right of the image reading unit 401 in the sub-scanning direction, so that the FFC 102 and the connection portion 103 of the sensor substrate 404 are also provided on the right of the image reading unit 401 in the sub-scanning direction in FIG. 4.

The FFC 102 connected to the connection portion 103 is guided to the other side of the image reading unit 401 in the sub-scanning direction via the bottom surface of the image reading unit 401 so as not to prevent the reading of an image. A curvature portion 106 needs to be provided to prevent the FFC 102 from being buckled when the image reading unit 401 is reciprocally moved in the sub-scanning direction 403.

Figure 1:
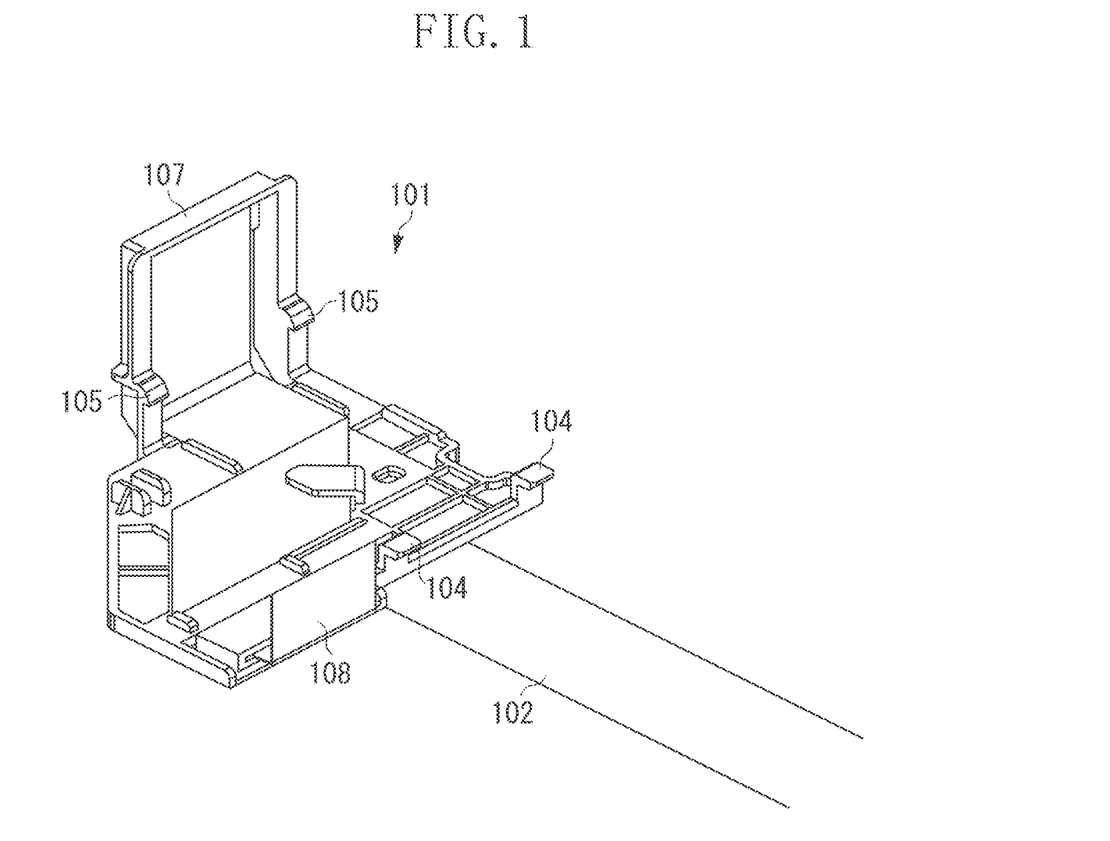
FIG. 1 is a schematic diagram illustrating a holding member.
Figure 10:
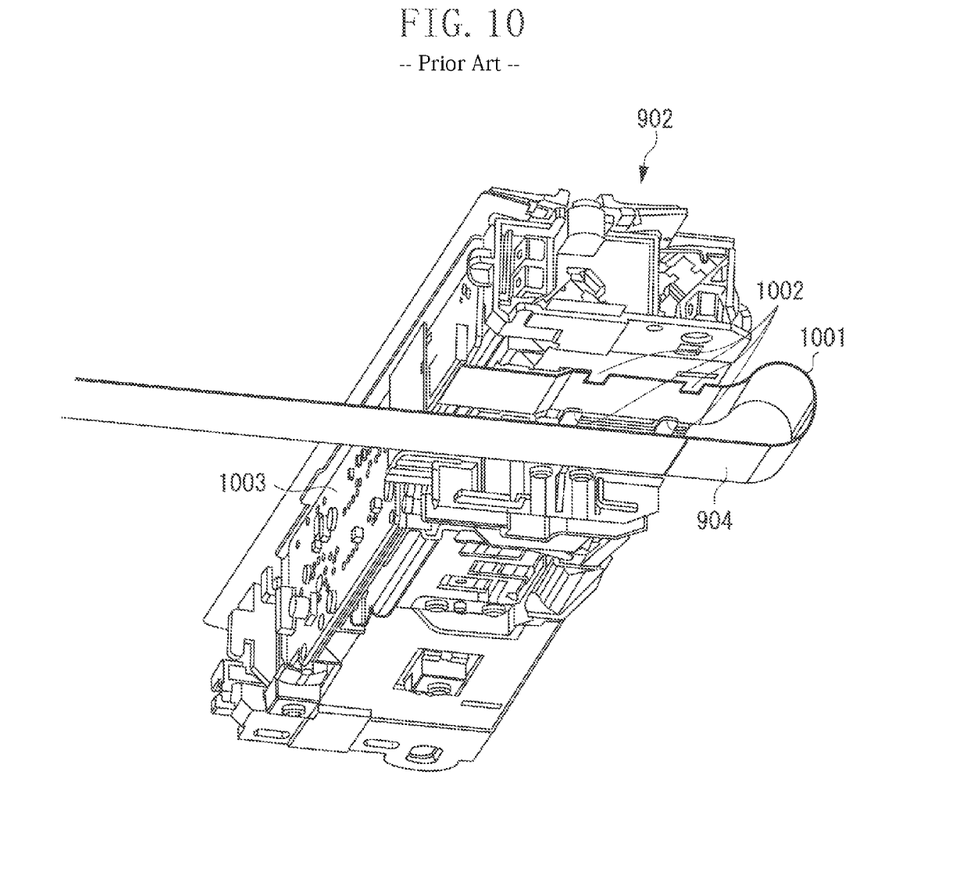
FIG. 10 illustrates a relationship between a conventional image reading unit and the FFC.

In the conventional technique illustrated in FIG. 10, the FFC 904 is attached to the bottom surface of the image reading unit 902 using the guide portions 1002 provided on the bottom surface of the image reading unit 902. On the other hand, in the present exemplary embodiment, the FFC 102 is attached to the image reading unit 401 using a holding member 101. FIG. 1 is a schematic diagram illustrating the holding member 101.

The FFC 102 is attached to the holding member 101 using a double-faced tape. The holding member 101 to which the FFC 102 is attached is attached to the image reading unit 401 using a claw portion 104 and a snap fit portion 105.

The use of the simply attachable holding member 101 eliminates the need for the worker of guiding the FFC to the guide portions 1002 provided on the bottom surface of the image reading unit, which is performed when the conventional apparatus illustrated in FIG. 10 is assembled. This can prevent wrinkles and scratches from being made in the work for guiding the FFC to the guide portions 1002. More specifically, the use of the holding member 101 can prevent the FFC from being damaged in the assembly work and can readily attach the FFC to the image reading unit 401.

Figure 5:
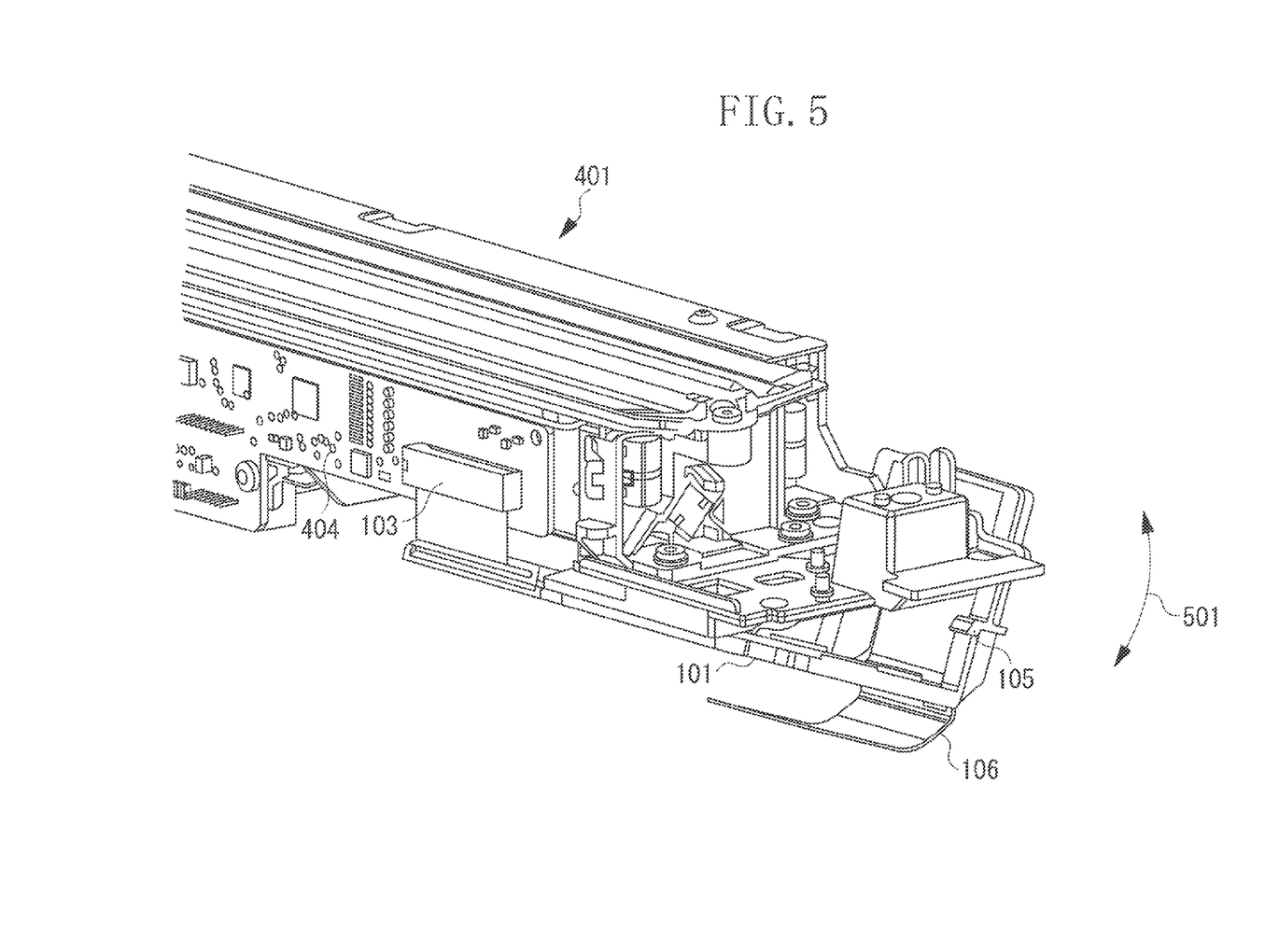
FIG. 5 is a schematic diagram illustrating an operation for attaching the holding member to an image reading unit.

A positional relationship between the claw portion 104 and the snap fit portion 105 of the holding member 101 is described below with reference to FIGS. 1 and 5. FIG. 5 is a schematic diagram illustrating an operation for attaching the holding member 101 to the image reading unit 401.

An FFC end 108 is an end of the FFC 102 connected to the connection portion 103 of the image reading unit 401. The claw portion 104 of the holding member 101 is provided on the same side as the FFC end 108. The snap fit portion 105 of the holding member 101 is provided on the opposite side of the claw portion 104. On the opposite side of the claw portion 104, the curvature portion 106 of the FFC is also provided.

The claw portion 104 and the snap fit portion 105 are thus arranged to enable the holding member 101 to be readily attached and detached, irrespective of whether the FCC end 108 is connected to the connection portion 103.

When the holding member 101 is attached to the image reading unit 401, a worker first hooks the claw portion 104 on a predetermined place of the image reading unit 401. Thereafter, as indicated in a holding member rotation direction 501, the holding member 101 is rotated to fit the snap fit portion 105 on the predetermined place of the image reading unit 401. The worker allows the holding member 101 to be attached to the image reading unit 401. The snap fit portion 105 is provided on the side of the curvature portion 106 of the FFC to prevent the holding member 101 from being pulled by the FFC even when the holding member 101 is rotated as indicated in the holding member rotation direction 501.

When the holding member 101 is detached from the image reading unit 401, the worker first detaches the snap fit portion 105 from the image reading unit 401. Thereafter, the holding member 101 is rotated as indicated in the holding member rotation direction 501, and then the claw portion 104 is detached from the image reading unit 401. Since the claw portion 104 is provided on the same side as the FCC end 108, a positional relationship between the FCC end 108 and the connection portion 103 of the image reading unit 401 can be maintained until the holding member 101 is detached from the image reading unit 401. In other words, even if the FCC end 108 is connected to the connection portion 103, the holding member 101 can be detached from the image reading unit 401. Since the FCC end 108 can be detached from the connection portion 103 after the holding member 101 is detached, the FCC end 108 can also be easily detached. The possibility can be reduced that a large force used in detaching the snap fit portion 105 from the image reading unit 401 may be applied to the connection portion 103 and that the FCC end 108 and the connection portion 103 may be damaged.

Figure 6A:
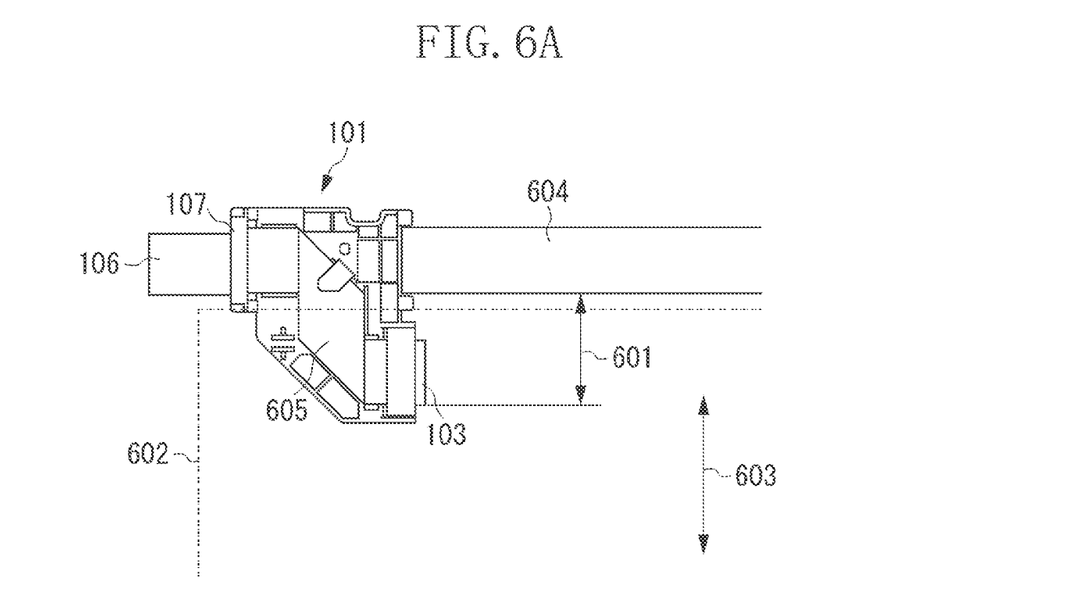
FIGS. 6A and 6B are diagrams illustrating the holding member attached to the image reading unit, as viewed from the side of a platen.
Figure 6B:
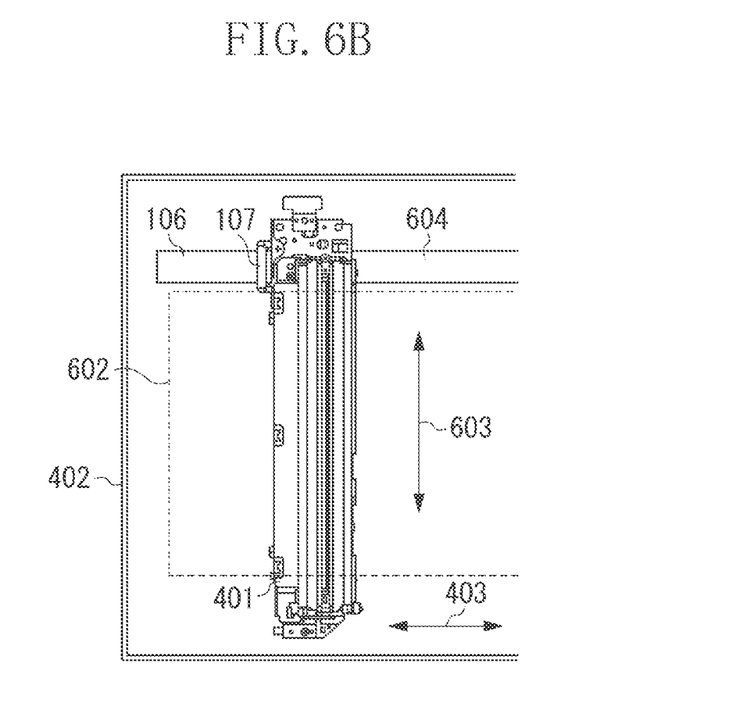

FIGS. 6A and 6B are diagrams in which the holding member 101 attached to the image reading unit 401 arranged in the frame member 402 of the image reading apparatus 202 is viewed from the side of the platen 301. In FIGS. 6A and 6B, the curvature portion 106 of the FFC 102, a folding portion 605 inside the holding member 101, and a portion 604 except a folding portion are illustrated with reference numerals.

As illustrated in FIG. 6B, there are arranged a frame member 402 of the image reading apparatus 202, the image reading unit 401, the FFC, and an image reading area 602 (or, area of the platen 301). If the FFC contacts the platen 301, foreign matters such as dust may adhere to the platen 301, and this can degrade image quality. In the present exemplary embodiment, as illustrated in FIG. 6A, the FFC connected to the connection portion 103 of the image reading unit 401 arranged inside the image reading area 602 is displaced to the outside of the image reading area 602 in the main scanning direction 603 using the holding member 101. The main scanning direction 603 is the direction orthogonal to the sub-scanning direction 403. More specifically, the FFC is folded twice inside the holding member 101 to arrange the curvature portion side of the FFC 604 on the outside of the image reading area 602. The position of the curvature portion side of the FFC 106 is displaced by a predetermined distance 601 in the main scanning direction with respect to the position of the connection portion side of the FFC. Thus, the FFC outside the holding member 101 (i.e., the FFC curvature portion 106 and the FFC except a folding portion 604) can be arranged outside the image reading area 602, thus preventing the FFC from contacting the platen 301.

Figure 7:
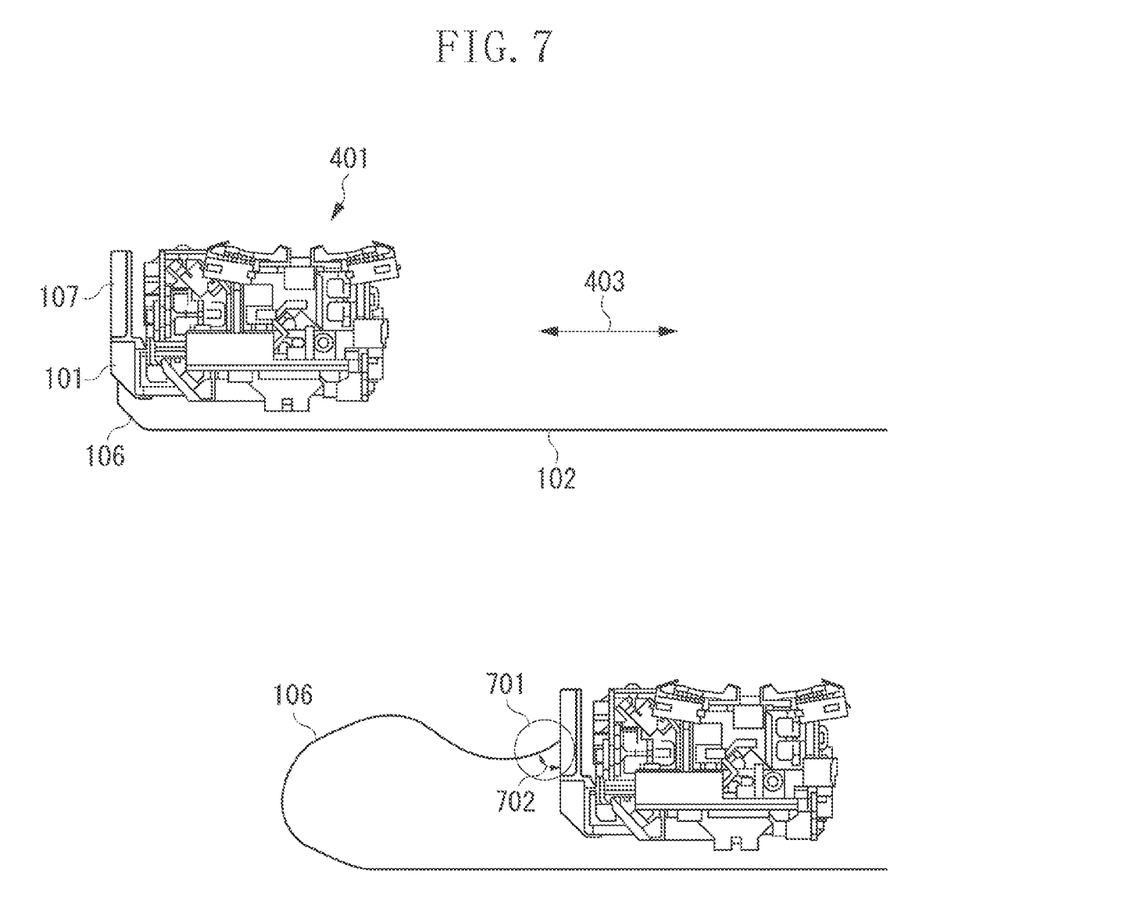
FIG. 7 is a schematic diagram illustrating a state of a curvature portion of an FFC in using the holding member including a holding portion.
Figure 8:
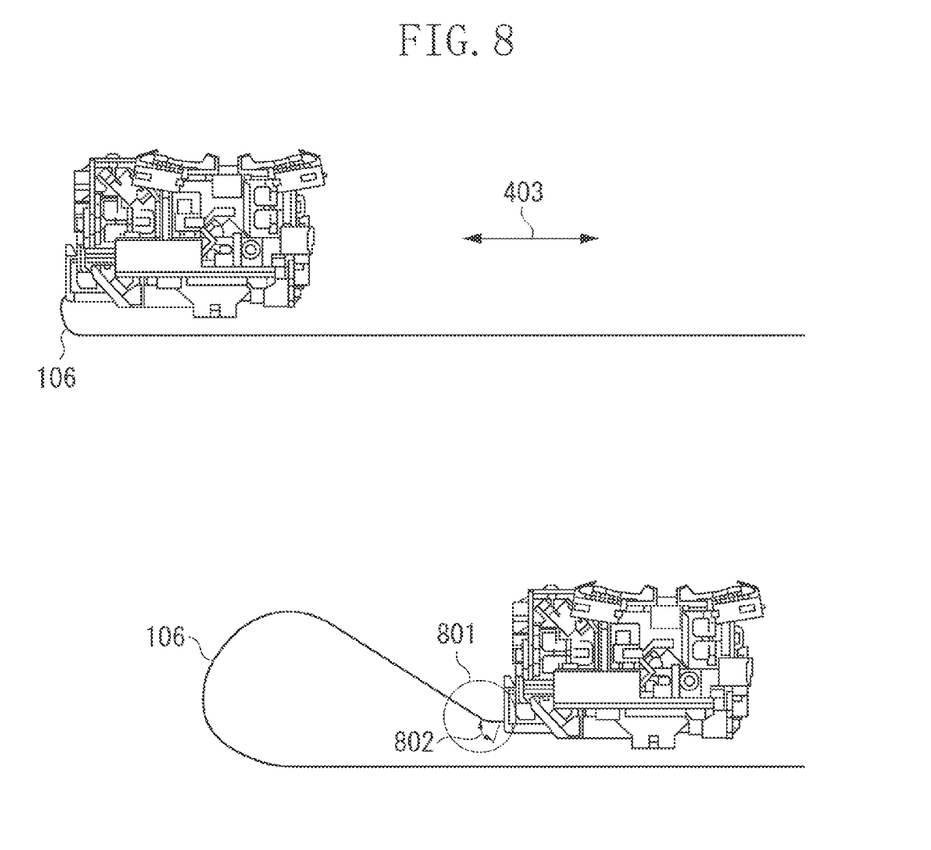
FIG. 8 is a schematic diagram illustrating a state of a curvature portion of the FFC in using the holding member not including the holding portion.

The following describes how effective a holding portion 107 is provided on the holding member 101. FIGS. 7 and 8 are schematic diagrams illustrating how the reciprocal movement of the image reading unit 401 in the sub-scanning direction affects the curvature portion 701 of the FFC 102 by the presence or absence of the holding portion 107.

The holding member 101 of the present exemplary embodiment illustrated in FIG. 7 includes the holding portion 107 extending toward the platen 301. The FFC extending from the bottom surface of the image reading unit 401 is folded upward (toward the platen 301) by the holding portion 107.

As illustrated in FIG. 8, a holding member not including the holding portion 107 may be used from the viewpoint of workability at the time of assembling the FFC. However, it is effective to use the holding member 101 including the holding portion 107 to increase a durability life of the FFC.

As illustrated in FIGS. 7 and 8, when the image reading unit 401 reciprocally moves in the sub-scanning direction 403, the curvature portions 701 and 801 are formed on the FFC. As illustrated in FIG. 7, when the holding portion 107 is provided, the curvature portion 701 has a curvature angle 702. As illustrated in FIG. 8, when the holding portion 107 is not provided, the repetitive curvature portion 801 has a curvature angle 802. If the curvature angle is greater when the image reading unit 401 reciprocally moves, the repetitive fatigue caused on the curvature portion becomes greater. As is clear from FIGS. 7 and 8, the curvature angle 702 is smaller than the curvature angle 802. Consequently, the holding portion 107 is provided to reduce the fatigue caused on the curvature portion, and this can increase the durability life of the FFC.

While the present disclosure has been described with reference to exemplary embodiments, it is to be understood that these embodiments are not limiting. The scope of the following claims is to be accorded the broadest interpretation so as to encompass all such modifications and equivalent structures and functions.

This application claims the benefit of Japanese Patent Application No. 2012-177087 filed Aug. 9, 2012, which is hereby incorporated by reference herein in its entirety.

What is claimed is:

1. An image reading apparatus comprising:
    a platen configured to hold a document placed on the platen;
    an image reading unit configured to be movable under the platen, to receive light reflected by the document placed on the platen, and to output an image signal;
    a flexible flat cable configured to transfer the image signal output from the image reading unit; and
    a holding member configured to hold the flexible flat cable and detachably attached to the image reading unit, the holding member including a fixing portion configured to fix the flexible flat cable before the holding member is attached to the image reading unit;
    wherein the image reading unit includes a connection portion to which the flexible flat cable is connected, and, when the image reading unit is moved, a curvature portion of the flexible flat cable is formed opposite the connection portion across the image reading unit in a direction in which the image reading unit is moved,
    wherein the fixing portion fixes the flexible flat cable such that a position of a curvature portion side of the flexible flat cable is away from a position of a connection portion side of the flexible flat cable held by the holding member, in a direction orthogonal to the direction in which the image reading unit is moved and in a direction orthogonal to a vertical direction, and
    wherein the curvature portion of the flexible flat cable is arranged outside a reading area of the image reading unit in the direction orthogonal to the direction in which the image reading unit is moved and in the direction orthogonal to the vertical direction.

2. The image reading apparatus according to claim 1, wherein the holding member is attached to a bottom surface of the image reading unit.

3. The image reading apparatus according to claim 2, wherein the holding member includes a holding portion configured to fold the flexible flat cable toward the platen from the bottom surface of the image reading unit in attaching the holding member to the image reading unit, and the holding portion is bent from the bottom portion of the holding member toward the platen, and is arranged on the same side as the curvature portion of the flexible flat cable.

4. The image reading apparatus according to claim 1, wherein the holding member includes a claw portion and a snap fit portion and is attached to the image reading unit by the claw portion and the snap fit portion.

5. The image reading apparatus according to claim 4, wherein the claw portion attaches to the image reading unit on the same side of the image reading unit as the connection portion, and the snap fit portion attaches to the image reading unit on the same side of the image reading unit as the curvature portion of the flexible flat cable.

6. The image reading apparatus according to claim 1, wherein the image reading unit includes an illumination unit, and an optical lens.

7. The image reading apparatus according to claim 1, further comprising a controller configured to process the image signal output from the image reading unit,
    wherein the flexible flat cable is connected to the controller.

8. The image reading apparatus according to claim 1, wherein the fixing portion is a double-faced tape.

9. The image reading apparatus according to claim 1, wherein the fixing portion is a clamp portion.

10. The image reading apparatus according to claim 1,
wherein the image reading unit includes an image sensor which receives light reflected by the document placed on the platen, and generates the image signal, and
wherein the flexible flat cable is configured to transfer the image signal generated by the image reading unit.

11. An image reading apparatus comprising:
a platen configured to hold a document placed on the platen;
an image reading unit configured to be movable under the platen, to receive light reflected by the document placed on the platen, and to output an image signal;
a flexible flat cable configured to transfer the image signal output from the image reading unit; and
a holding member configured to hold the flexible flat cable and detachably attached to the image reading unit, the holding member including a fixing portion configured to fix the flexible flat cable before the holding member is attached to the image reading unit;
wherein the image reading unit includes a connection portion to which the flexible flat cable is connected, and, when the image reading unit is moved, a curvature portion of the flexible flat cable is formed opposite the connection portion across the image reading unit in a direction in which the image reading unit is moved,
wherein the fixing portion fixes the flexible flat cable such that a position of the curvature portion of the flexible flat cable is away from a position of the connection portion of the image reading unit, in a direction orthogonal to the direction in which the image reading unit is moved and in a direction orthogonal to a vertical direction, and
wherein the curvature portion of the flexible flat cable is arranged outside a reading area of the image reading unit in the direction orthogonal to the direction in which the image reading unit is moved and in the direction orthogonal to the vertical direction.

12. An image reading apparatus comprising:
a platen configured to hold a document placed on the platen;
an image reading unit configured to be movable under the platen, to receive light reflected by the document placed on the platen, and to output an image signal;
a flexible flat cable configured to transfer the image signal output from the image reading unit; and
a holding member that is configured to hold the flexible flat cable and that is detachably attached to the image reading unit, the holding member including a fixing portion configured to fix the flexible flat cable before the holding member is attached to the image reading unit;
wherein the image reading unit includes a connection portion to which the flexible flat cable is connected, and, when the image reading unit is moved, a curvature portion of the flexible flat cable is formed opposite the connection portion across the image reading unit in a direction in which the image reading unit is moved, and
wherein the holding member includes a claw portion and a snap fit portion and is attached to the image reading unit by the claw portion and the snap fit portion.

* * * * *